United States Patent
Lucas et al.

(10) Patent No.: US 7,565,242 B2
(45) Date of Patent: Jul. 21, 2009

(54) METHOD AND DEVICE FOR TRIGGERING EMERGENCY BRAKING

(75) Inventors: Bernhard Lucas, Besigheim (DE); Ulf Wilhelm, Rutesheim (DE); Martin Randler, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 758 days.

(21) Appl. No.: 11/201,614

(22) Filed: Aug. 10, 2005

(65) Prior Publication Data

US 2006/0058964 A1    Mar. 16, 2006

(30) Foreign Application Priority Data

Aug. 10, 2004    (DE) .................... 10 2004 038 734

(51) Int. Cl.
  *G06F 17/00*    (2006.01)
(52) U.S. Cl. .................... 701/301; 701/300; 701/96
(58) Field of Classification Search ............. 701/29–41, 701/301, 302, 200, 93, 96; 340/437, 435, 340/436, 901, 903
  See application file for complete search history.

(56) References Cited

U.S. PATENT DOCUMENTS

| | | | |
|---|---|---|---|
| 6,517,172 B1 | 2/2003 | Bond, III et al. | |
| 7,409,295 B2 * | 8/2008 | Paradie | 701/301 |
| 7,412,329 B2 * | 8/2008 | Urai et al. | 701/301 |
| 7,418,346 B2 * | 8/2008 | Breed et al. | 701/301 |
| 7,426,437 B2 * | 9/2008 | Breed et al. | 701/301 |

FOREIGN PATENT DOCUMENTS

| | | |
|---|---|---|
| DE | 19738690 | 3/1999 |
| DE | 10231584 | 3/2003 |
| DE | 102 31 557 | 7/2003 |
| FR | 2769884 | 4/1999 |

\* cited by examiner

*Primary Examiner*—Richard M. Camby
(74) *Attorney, Agent, or Firm*—Kenyon & Kenyon LLP

(57) ABSTRACT

A method and a device for triggering emergency braking of a vehicle for avoiding a collision or for reducing the severity of a collision, the vehicle having at least one object detection sensor, an ascertainment being made as a function of the detected objects as to whether a collision with an object is imminent and a risk to one's own vehicle in the event of a triggering of emergency braking being ascertained as a function of the current surrounding situation, the triggering threshold for emergency braking being variable in such a way that the probability for a false triggering is increased if a calculated risk posed by emergency braking is low and the triggering threshold for emergency braking being variable in such a way that the probability for a false triggering is lowered if a calculated risk posed by emergency braking is higher.

13 Claims, 3 Drawing Sheets

US 7,565,242 B2

METHOD AND DEVICE FOR TRIGGERING EMERGENCY BRAKING

FIELD OF THE INVENTION

The present invention relates to a method and a device for triggering emergency braking of a vehicle for avoiding a collision or for reducing the severity of a collision, the vehicle having at least one object detection sensor, an ascertainment being made as a function of the detected objects as to whether a collision with an object is imminent and a risk to one's own vehicle in the event of a triggering of emergency braking being ascertained as a function of the current surrounding situation, the triggering threshold for emergency braking being variable in such a way that the probability for a false triggering is increased if a calculated risk posed by emergency braking is low and the triggering threshold for emergency braking being variable in such a way that the probability for a false triggering is lowered if a calculated risk posed by emergency braking is higher.

BACKGROUND INFORMATION

German Published Patent Application No. 102 31 557 describes a method and a device for triggering and implementing a deceleration of a vehicle for preventing a collision, in which, using a device for the distance and velocity control of the vehicle, objects are detected in the detecting range of the sensor, and for each detected objects measured variables are ascertained, the detected objects are assigned to different object classes on the basis of the ascertained, associated measured variables, and on the basis of the assignment of the detected objects to the respective class, the movement trajectories of the objects are predicted. From these predicted movement trajectories of the objects and the associated detected object class, additionally a collision risk is ascertained and if a specifiable collision risk exists, then the deceleration devices of the vehicle are triggered as a function of the degree of the collision risk.

SUMMARY OF THE INVENTION

The present invention relates to a method and a device, which on the one hand are able to ascertain the probability of a collision of one's own vehicle with another object, and which may perform emergency braking to avoid a collision or to attenuate the consequences of a collision. Since automatically triggered and implemented emergency braking represents a risk to one's own vehicle as well as to the surroundings of the vehicle since it is difficult to control the vehicle during emergency braking and establishing the triggering threshold is associated with difficulties regarding their threshold value since it can only be determined in retrospect whether emergency braking was triggered for good reason or was triggered unnecessarily, the triggering threshold is to be varied as a function of the possible risk to which the vehicle and its occupants are exposed as a result of automatic emergency braking.

This is achieved in that in traffic situations in which automatic emergency braking would represent a high risk to one's own vehicle and its occupants, triggering only occurs at a higher collision risk than in driving situations in which the risk to one's own vehicle and its occupants is lower. The risk to one's own vehicle is high, for example, if one is driving on a highly frequented road and many other vehicles are present in the vehicle's surroundings, if the vehicle is driven at a high velocity, or if, due to the presence of buildings, the edge of the roadway offers only little safety and runout surface. Accordingly, the risk in possible emergency braking is lower if one drives on a scarcely traveled road, if the velocity of one's own vehicle is low and/or if the edge of the road is adjoined by an empty field offering sufficient runout surface. Furthermore, for determining the risk in automatic emergency braking, the further course of the roadway may be taken into account as well in that an evaluation is made as to whether there are any curves ahead and how many, and what radii of curvature these have or whether one is driving on a straight roadway.

Advantageously, a false triggering occurs if the deceleration devices of the vehicle were triggered automatically to perform emergency braking, yet no collision has occurred during the automatic deceleration of the vehicle or shortly after the ensued standstill of the vehicle.

Furthermore, it is advantageous that the risk posed by emergency braking is ascertainable from the moving and stationary objects detected in the vehicle's surroundings. The risk posed by emergency braking in this context is a measure, which can lie between 0 and 1 for example, and which indicates whether, during or shortly after the implementation of automatic emergency braking of the vehicle, additional critical traffic situations including possible additional collisions arise without intervention of the driver as a result of automatic emergency braking.

It is especially advantageous that for calculating the risk posed by emergency braking, the number of traffic lanes of the road traveled, the currently traveled traffic lane, the traffic density by the detected moving objects of the road traveled, the vehicle's own velocity, the positions of the stationary objects at the edge of the roadway, the curves in the further course of the roadway as well as their radii of curvature, the calculated collision probability or a combination of these are evaluated. These variables can be read out of the received data of the object sensors as well as out of a possibly present navigational device or a velocity sensor for measuring the vehicle's own velocity and can be used for evaluating the surroundings so as to determine the measure of risk. Furthermore, a triggering of emergency braking is useful in the case of a low risk of collision if it has been established by detection that the vehicle is moving within city limits, in a 30 km/h zone or in a play street.

Furthermore, it is advantageous that the objects detected in the vehicle's surroundings are detected using an object sensor system made up of a radar sensor, a laser sensor, a video sensor, an ultrasonic sensor or a combination of these sensor types.

Furthermore, it is advantageous that, together with the triggering of emergency braking, occupant restraint systems, particularly airbags and/or belt tensioners can be activated as well.

The implementation of the method of the present invention in the form of a control element provided for a control unit of an adaptive distance and velocity control of a motor vehicle is of particular importance. To this end, a program executable on a computer, in particular on a microprocessor or signal processor, and suitable for implementing the method according to the present invention, is stored in the control element. Thus, in this case, the present invention is implemented by a program stored in the control element, so that this control element equipped with the program constitutes the present invention in the same manner as does the method, for the execution of which the program is suitable. In particular, an electric storage medium, e.g. a read-only memory, may be used as a control element.

DETAILED DESCRIPTION

Figure 1:
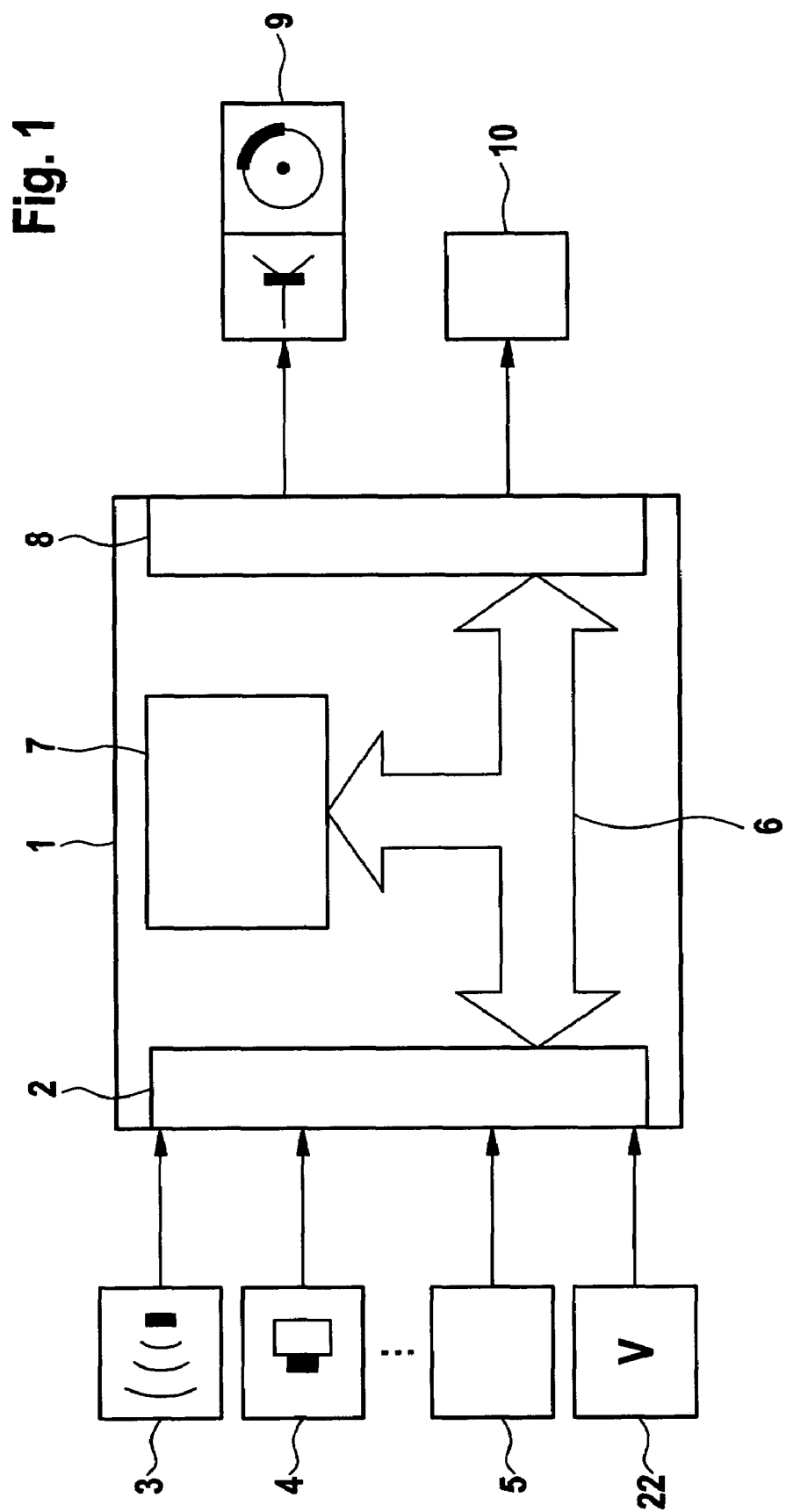
FIG. 1 shows a schematic block diagram of an exemplary embodiment of the device according to the present invention.

FIG. 1 shows a schematic block diagram of an exemplary embodiment of the device according to the present invention. This has an emergency braking control unit 1, which has an input circuit 2. Via input circuit 2, emergency braking control unit 1 can be supplied with input signals, these stemming from at least one object detection sensor system 3, 4. As object detection sensor system it is possible to provide a radar sensor, a lidar sensor, an ultrasonic sensor, a video sensor or a combination of these types of sensors. These sensors monitor the vehicle's surroundings, in particular the area in front of one's own vehicle, and detect the objects present within it. In this case, within the framework of the object sensor system, one or several sensors of one sensor type or several sensors of different sensor types may be used in order to be able to cover the surroundings of the vehicle sufficiently and to be able to identify relevant objects as relevant. In particular the combination of one or several radar sensors or laser sensors in combination with a video sensor has proved to be a particularly advantageous combination. Furthermore, input values may also be provided by a navigation system 5, which, for example as a function of the current vehicle position, which can be determined with the aid of a satellite navigation receiver that is a component of navigation system 5, provides additional data from a database, with the aid of which it is possible to determine whether the currently traveled road is a single-lane or multiple-lane road, whether there are curves in the future course of the vehicle or whether the road leads through a build-up area or through an area that is not built-up. Object sensors 3, 4 provide emergency braking control device 1 with data concerning the detected objects, it being possible for these object variables to include in particular their distance to one's own vehicle, the azimuth angle of the objects with respect to the extended longitudinal axis of the vehicle, their lateral extension, their relative velocity. Furthermore, a velocity signal v of a velocity sensor 22 is provided, which represents the velocity of one's own vehicle. With the aid of this velocity signal v, it is possible for example to convert the relative velocities of the objects detected by object sensors 3, 4 into absolute velocities and to ascertain the determination of the risk posed by automatic emergency braking in combination with the other input variables. The input variables supplied to input circuit 2 of emergency braking control unit I are relayed via a data exchange device 6 to a calculation device 7. From the input variables, calculation device 7 calculates a collision probability, this collision probability value K possibly lying for example between 0 and 1 and indicating with what probability an unavoidable collision is imminent. Furthermore, calculation device 7 ascertains from the input values a degree of risk G, which specifies whether and to what degree one's own vehicle as well as the detected objects would be exposed to risk by additional collisions in possible automatic emergency braking. In this case, the degree of risk G can be established as a numerical value or can be defined as one of several possible risk levels. By evaluating collision probability K as well as degree of risk G, calculation device 7 decides whether emergency braking shall be implemented or not. If automatic emergency braking is implemented by calculation device 7, then this trigger signal is relayed via data exchange device 6 to an output circuit 8, which outputs actuating signals to actuators downstream. As downstream actuating element, for example, the vehicle's braking system 9 may be provided, which can be triggered using electrical signal and which via a braking control device builds up a braking pressure, which, with the assistance of the wheel brakes, builds up a deceleration of the vehicle in order to avoid a collision. Furthermore, additional occupant restraint systems may be activated by the trigger signal that is output by output circuit 8, for example in that belt tensioners are pre-tightened so that the vehicle occupants are sitting in the best position for keeping the risk of injury to a minimum. Furthermore it is possible to fire airbags as occupant restraint system 10, which protect the occupants against serious injuries in the event of a collision. Via the trigger signal, these airbags can be brought into a ready-to-fire state such that they fire at the appropriate time or in that a firing in steps is initiated.

Figure 2:
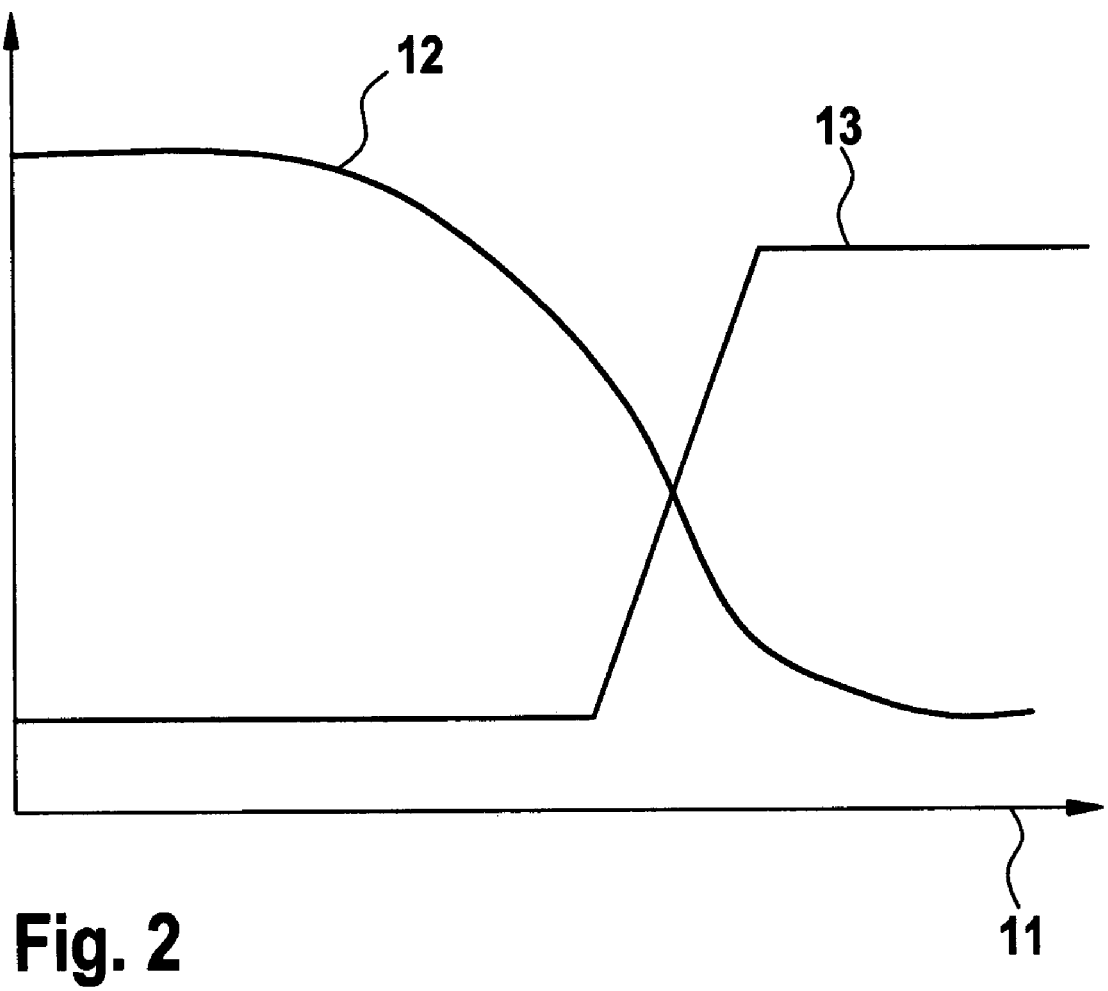
FIG. 2 shows a diagram showing the dependence of the false triggering rate of the automatic emergency braking system in connection with the degree of risk.

FIG. 2 shows a diagram representing the false triggering rate 13 as a function of degree of risk G 12. Various traffic situations can be arranged on the abscissa 11, these traffic situations being sorted in such a way that they are sorted according to their degrees of risk G. This yields a curve for degree of risk G 12, which, starting from a maximum risk, falls along increasing abscissa values towards smaller risk values G. Furthermore, a curve is plotted for false triggering rate 13, this curve correlating to a low false triggering rate in the case of abscissa values that have a high degree of risk G and correlating to a high false triggering rate in the case of abscissa values that have a low degree of risk G. This means that in situations in which the risk to one's own vehicle posed by possible automatic emergency braking would be very high, the false triggering rate must be kept low, for example, by shifting the trigger threshold for an automatic emergency brake in the direction of higher values. In non-critical driving situations, by contrast, in which for example from the vehicle's surroundings no additional risk for one's own vehicle is posed as a result of automatically triggered emergency braking, the false triggering rate can become higher in that for example the trigger threshold for automatic emergency braking is lowered and thus a possibly implemented emergency braking action without an ensuing collision does not trigger any additional collisions or dangerous driving situations. This yields the advantage that it is possible to trigger emergency braking already in situations having a low probability of collision, thus increasing the usefulness of emergency braking since it is possible to trigger earlier.

Figure 3:
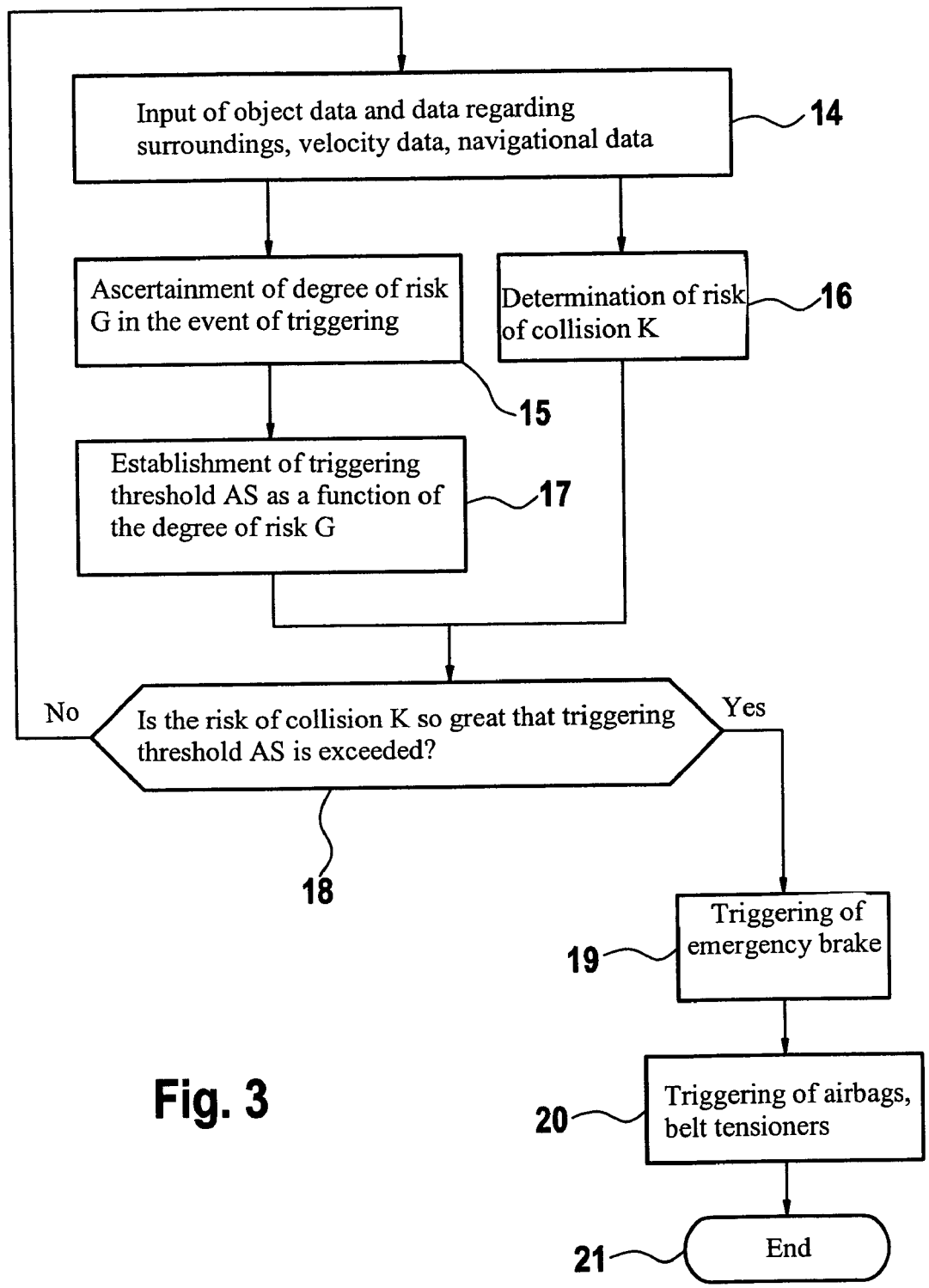
FIG. 3 shows a flow chart of a specific embodiment of the method according to the present invention.

FIG. 3 shows a flow chart. According to this diagram, the object data, data concerning the surroundings, velocity data and navigation system data that are supplied to emergency braking control unit 1 via input circuit 2 are input in step 14. From these input data, calculation device 7 of emergency braking control device 1 ascertains a degree of risk G in the event that automatic emergency braking would be triggered. For this purpose, particularly the traffic density known from the object data, the vehicle's own velocity, the position of the stationary objects at the edge of the roadway, the number of lanes of the road traveled as well as the currently used lane, which is ascertainable by the navigation system for example, as well as possible curves in the further course of the roadway as well as their radii of curvature, which are likewise known from the navigation system, are drawn upon. As a function of the degree of risk G ascertained in step 15, the triggering threshold AS is established in the subsequent step 17. For this purpose, the dependence of triggering threshold AS on degree of risk G may be stored for example using a table in calculation device 7 or may be ascertained by a calculation device from a numerical value of degree of risk G. Parallel to this, the risk of collision K is determined in step 16 from the data input in step 14 in that it is ascertained from the positions, the velocities as well as the directions of movement, which are determinable by object tracking from the previous object positions, whether the possibility of a collision with another moving object within the object detection range of the object sensory system is possible and if so, what probability of collision exists in this regard. In the following query step 18, a check is performed as to whether the risk of collision K is so great that triggering threshold AS is exceeded, which was established as a function of the degree of risk G for the current situation. If probability of collision K is lower than triggering threshold AS established in step 17, then step 18 branches to no since there is either no possibility of a collision with another moving object or the degree of risk G of the current driving situation was so great that triggering threshold AS was increased to such an extent that probability of collision K is not sufficient to trigger automatic emergency braking. If it was established in step 18, however, that probability of collision K is sufficiently high such that triggering threshold AS is exceeded, then step 18 branches to yes and in accordance with step 19 automatic braking is initiated and carried out by deceleration device 9. Moreover, according to step 20 an activation of occupant restraint systems may be optionally provided in that for example belt tensioners and/or airbags are used for protecting occupants. Once emergency braking as well as the triggering of occupant protection systems are accomplished, the method according to the present invention is ended in step 21.

What is claimed is:

1. A method for triggering an emergency braking of a vehicle for one of avoiding a collision and reducing a severity of a collision, the vehicle having at least one detection sensor, the method comprising the steps of:
    ascertaining a probability of collision as a function of a detected object;
    triggering the emergency braking as a function of the probability of collision; and
    ascertaining a risk to the vehicle in the event that the emergency braking is triggered as a function of a current situation in surroundings of the vehicle, wherein a triggering threshold for the emergency braking is variable in such a way that, if the ascertained risk posed by the emergency braking is low, a probability for false triggering is increased, and if the ascertained risk posed by the emergency braking is higher, then the probability for false triggering is reduced.

2. The method as recited in claim 1, wherein the false triggering is a triggering of a deceleration device, in a deceleration characteristic of which no collision occurred.

3. The method as recited in claim 1, wherein the ascertained risk posed by the emergency braking is ascertainable from moving and stationary objects detected in the surroundings of the vehicle.

4. The method as recited in claim 1, wherein for ascertaining the risk posed by emergency braking at least one of the following is evaluated:
    a number of lanes of a road traveled;
    a currently used lane;
    a traffic density due to detected, moving objects of the road traveled;
    a velocity of the vehicle;
    positions of stationary objects at an edge of a roadway;
    curves in a further course of the roadway radii of curvature of the curves; and
    the ascertained probability of collision.

5. The method as recited in claim 1, wherein objects in the surroundings are detected by an object detection sensory system that includes one of a radar sensor, a laser sensor, a video sensor, an ultrasonic sensor, and a combination of the radar sensor, the laser sensor, the video sensor, and the ultrasonic sensor.

6. The method as recited in claim 1, wherein together with the triggering of the emergency braking, occupant restraint systems including at least one of an airbag and a belt tensioner are capable of being activated.

7. A device for triggering an emergency braking of a vehicle for one of avoiding a collision and reducing a severity of a collision, comprising:
    a calculation device; and
    at least one detection sensor for producing ascertained object data that is supplied to the calculation device, wherein:
        the calculation device ascertains, as a function of a detected object, whether a collision with the detected object is imminent and is able to trigger the emergency braking as a function of a probability of the collision;
        the calculation device ascertains a risk to the vehicle in the event that the emergency braking is triggered as a function of a current situation in surroundings detected by the at least one object detection sensor;
        triggering threshold for the emergency braking is variable in such a way that a probability for a false triggering is increased if the ascertained risk posed by the emergency braking is low; and
        the triggering threshold is variable in such a way that the probability for the false triggering is reduced if the ascertained risk posed by the emergency braking is greater.

8. A device for triggering an emergency braking of a vehicle for one of avoiding a collision and reducing a severity of a collision, comprising:
    a control unit; and
    at least one detection sensor that is configured to produce, and supply to the control unit, object data;
    wherein:
        the control unit is configured to:
            ascertain a probability of collision as a function of a detected object indicated by the object data;
            trigger the emergency braking as a function of the probability of collision; and
            ascertain a risk to the vehicle in the event that the emergency braking is triggered as a function of a current situation in surroundings of the vehicle, the current situation indicated by the object data; and
        a triggering threshold for the emergency braking is variable in such a way that, if the ascertained risk posed by the emergency braking is low, a probability for false triggering is increased, and if the ascertained risk posed by the emergency braking is higher, then the probability for false triggering is reduced.

9. The device as recited in claim 8, further comprising:
    a deceleration device, wherein the false triggering includes a triggering of the deceleration device.

10. The method as recited in claim 8, wherein the ascertained risk posed by the emergency braking is ascertainable from moving and stationary objects detected in the surroundings of the vehicle.

11. The method as recited in claim 8, wherein for ascertaining the risk posed by emergency braking at least one of the following is evaluated:
   a number of lanes of a road traveled;
   a currently used lane;
   a traffic density due to detected, moving objects of the road traveled;
   a velocity of the vehicle;
   positions of stationary objects at an edge of a roadway;
   curves in a further course of the roadway radii of curvature of the curves; and
   the ascertained probability of collision.

12. The method as recited in claim 8, wherein the at least one detection sensor includes one of at least one of a radar sensor, a laser sensor, a video sensor, and an ultrasonic sensor.

13. The method as recited in claim 8, wherein the device is configured such that, together with the triggering of the emergency braking, an occupant restraint system, including at least one of an airbag and a belt tensioner, is activated.

* * * * *